United States Patent [19]
Puech et al.

[11] 4,252,402
[45] Feb. 24, 1981

[54] DEVICE FOR CONNECTING A PERIPHERAL UNIT TO AN OPTICAL BUS-LINE

[75] Inventors: Claude Puech; Michel Papuchon; Michel Werner; Brigitte Puech, all of Paris, France

[73] Assignee: Thomson-CSF, Paris, France

[21] Appl. No.: 963,947

[22] Filed: Nov. 27, 1978

[30] Foreign Application Priority Data

Nov. 30, 1977 [FR] France .................. 77 36041

[51] Int. Cl.³ .............................................. G02B 5/14
[52] U.S. Cl. .............................. 350/96.14; 250/227; 350/96.16
[58] Field of Search .................. 250/199, 227; 350/96.11, 96.12, 96.13, 96.14, 96.15, 96.16

[56] References Cited

U.S. PATENT DOCUMENTS

| | | | |
|---|---|---|---|
| 3,716,804 | 2/1973 | Groschwitz | 350/96.11 X |
| 4,026,632 | 5/1977 | Hill et al. | 350/96.15 |
| 4,089,584 | 5/1978 | Polczynski | 350/96.15 |
| 4,146,297 | 3/1979 | Alferness et al. | 350/96.14 |
| 4,161,650 | 7/1979 | Caouette et al. | 250/199 |
| 4,162,460 | 7/1979 | Gonda | 350/96.11 X |
| 4,166,946 | 9/1979 | Chown et al. | 250/199 |

FOREIGN PATENT DOCUMENTS

| | | | |
|---|---|---|---|
| 2712054 | 10/1977 | Fed. Rep. of Germany | 350/96.15 |
| 2042832 | 2/1971 | France . | |
| 2345739 | 10/1977 | France . | |

OTHER PUBLICATIONS

Altman "Fiber Optics Applications in the Shipboard Data Multiplex System", Final Report-Aug. 1976, Naval Elect. Lab. Center (San Diego).
Ogiwara et al., "Optical Waveguide Switch (3×3) . . .", Applied Optics, vol. 17, No. 8, Apr. 1978, pp. 1182-1186.

Primary Examiner—Paul A. Sacher
Assistant Examiner—John D. Lee
Attorney, Agent, or Firm—Cushman, Darby & Cushman

[57] ABSTRACT

A device for connecting a peripheral unit to an optical bus-line which comprises a substrate onto which are integrated a first optical waveguide for being inserted in the path of the bus-line, a second optical waveguide for being connected to the emitting circuit of the peripheral unit, a third optical waveguide for being connected to the receiving circuit of the peripheral unit, and three couplers for intercoupling these waveguides. A plurality of connections related to the peripheral unit are provided for controlling the couplers in order to control the emission or the reception of information on or from the bus-line.

6 Claims, 2 Drawing Figures

DEVICE FOR CONNECTING A PERIPHERAL UNIT TO AN OPTICAL BUS-LINE

This invention relates to devices for connecting to an optical bus-line transmitting and/or receiving apparatus, e.g peripherals of computers. The invention also relates to bus-lines comprising such a connecting device.

When it is desired to connect a series of units to one another, it is possible to form a more or less grid-like network of which the complexity increases with the number of units.

It is known that this network can be simplified by using a system called a bus line which consists of an electrical connection, often formed by multiconductors, to which all the units are connected by branching. Each unit transmits and/or receives signals-generally digital-through this connection. When the connection is formed by multiconductors, the digital signals are made up of words delivered in parallel at a rate of one bit per conductor. These signals are prevented from becoming mixed with one another by using either a system for allocating time to each unit or a beginning-of-message address system or even a combination of these two systems.

Attempts are at present being made to replace the electrical connections by optical fibres and it has been proposed to apply this technique to bus-lines.

However, although the problem of the fibres themselves has been substantially solved, at least over short distances such as those used in bus-lines, the connecting devices to the fibres are still under investigation, particularly in the case of such a bus-line where it is necessary to be able to transmit and receive the optical signals by means, if possible, of a single device.

In Applicants Japanese Patent Application Ser. No. 44715/1978 filed on Apr. 15, 1978 it is proposed to use a special emitting and receiving diode. However, the construction of a diode such as this in series is difficult.

The various components perfected over recent years in the field of integrated optics include couplers which use two parallel portions of an optical waveguide and of which the coupling is controlled by a set of electrodes under the action of a variable voltage applied to these electrodes. Couplers of this type are described e.g in Applicants' Japanese Patent Applications Ser. No. 72611/1975 and 48698/1976 filed on June 14, 1978 and Apr. 30, 1976 respectively which are incorporated by reference.

In accordance with the present invention, there is provided an optical bus-line connecting device, which comprises:
a substrate;
a first optical waveguide integrated onto said substrate for being inserted along the path of said bus-line;
a second optical waveguide integrated onto said substrate;
a third optical waveguide integrated onto said substrate;
means for emitting in said second optical waveguide first optical signals;
means for receiving from said third optical waveguide second optical signals;
first means integrated onto said substrate for coupling said first and second waveguides;
second means integrated onto said substrate for coupling said first and third waveguides;
third means integrated onto said substrate for coupling said second and third waveguides;
means for controlling said first, second and third coupling means.

For a better understanding of the invention, and to show how the same may be carried into effect, reference will be made to the ensuing description and to the attached figures among which:

Figure 1:
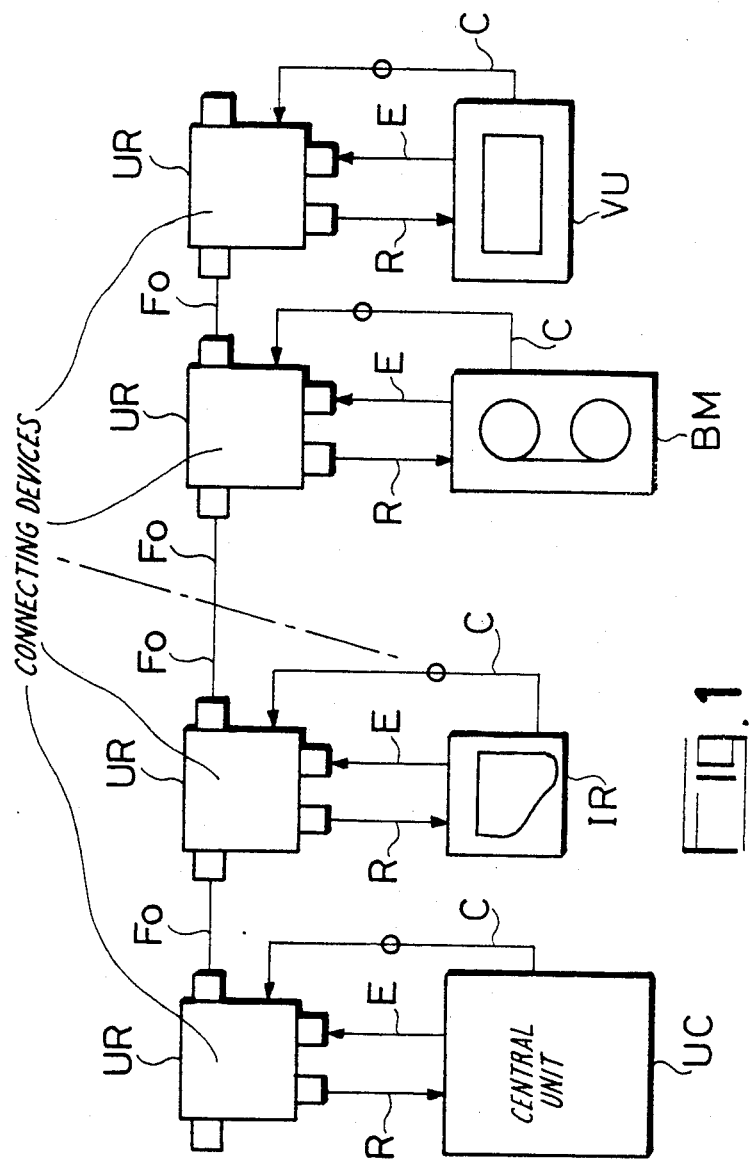
FIG. 1 illustrates the diagram of a data processing system using an optical bus-line.

The data processing system illustrated diagrammatically in FIG. 1 comprises a central processing unit UC connected to peripheral units including a printer IR, a tape recorder BM and a display console VU. This connection is established by a bus-line composed of optical fibres FO. These optical fibres are connected to one another by the connecting devices according to the invention UR which also enable the various units of the system to be connected to the bus line by electrical transmitting connections E and receiving connections R. Each of these devices is also connected to the unit which it serves by a connection C which enables the couplers contained in it to be controlled.

Figure 2:
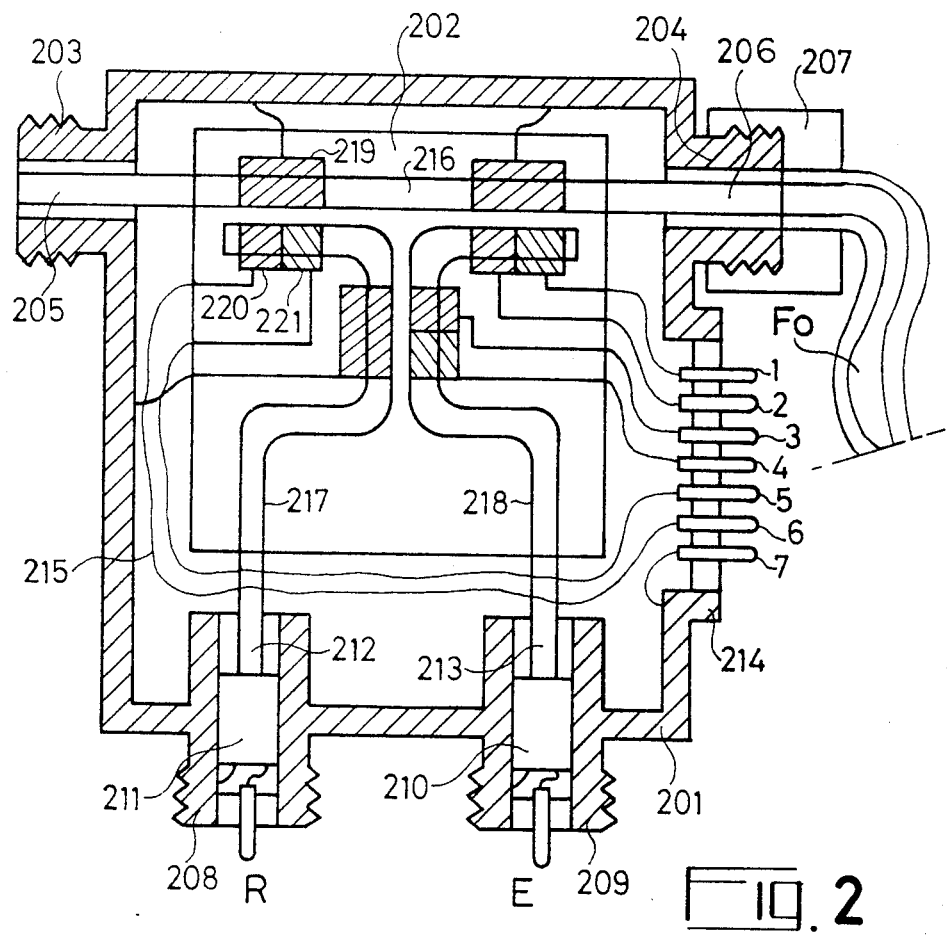
FIG. 2 illustrates an embodiment of a connecting device according to the invention.

The embodiment of a device according to the invention illustrated in FIG. 2 comprises a casing 201 illustrated in horizontal section. A substrate 202 is fixed in this casing, supporting the active elements of the device. Two male optical fibre connectors 203 and 204 contain two fibre fragments 205 and 206 for establishing the connection between the substrate and the fibres FO terminated by female connectors of which only the connector 207 is shown. Two coaxial electrical connectors 208 and 209 enable the electrical connections E and R to be connected. Through the central pin and the earth of the connector 209, the connection E feeds a light source, e.g a light-emitting laser diode represented diagrammatically by the element 210. The connection R is fed in the same way by a photosensitive receiver, e.g a photodiode, represented by the element 211. These electro-optical elements 210 and 211 are optically connected to the substrate by two fibre fragments 212 and 213. A multicircuit connector 214 comprises seven pins 1 to 7 which enable the various control circuits accommodated on the substrate to be fed through flexible wires, such as 215. The pin 7 is connected to the casing which forms the common earth. This connector enables the connection C to be received.

The active elements of the device are formed on the substrate 202 by the usual methods which enable the optical waveguides and the control electrodes of the couplers to be obtained. First of all there is a rectilinear guide 216 which connects the fibres 205 and 206, thus establishing the continuity of the optical bus-line. Another two guides 217 and 218 are situated in the extension of the fibres 212 and 213 to receive on the one hand the light emitted by the source 210 and to transmit on the other hand the light received by the receiver 211. These guides 217 and 218 are interrupted at their ends opposite the fibres 212 and 213 and are curved in such a way that each has a rectilinear portion parallel and adjacent to the guide 216 and portions parallel and adjacent to one another. The intervals between these adjacent portions and their lengths are such that the guides thus associated form three couplers which enable the light to pass from one to the other on the lines described hereinafter.

In order to control the passage of light from one guide to the other, these couplers additionally comprise three electrodes such as 219, 220 and 221 for one of the couplers taken as an example. One of these electrodes (219) extends over the entire coupling length whilst the other two (220 and 221) each extend over half that length. They are connected by the flexible wires mentioned above to the pins of the connector 214. However, the long electrodes, such as 219, which all have to be connected to earth are directly connected to the casing 201 in this example. By way of example, the short electrode 220 is connected by the wire 215 to the pin 6. Thus, by applying a positive voltage to one of the short electrodes and a negative voltage to the other, it is possible to control the passage of light from one of the guides to the other and vice versa. Depending on the polarity and value of these voltages, a more or less high percentage (from 0 to 100%) of the light will pass from one guide to the other; the coupler is thus said to be x% crossed. When x=0, the coupler is also said to be in the parallel state.

If the coupler connecting the guides 216 and 217 is called $C_1$, the coupler connecting the guides 216 and 218 $C_2$ and the coupler connecting the guides 217 and 218 $C_3$, the following configurations are possible:

1. Connected unit being transmitter, direct emission by the diode 210 (case of FIG. 1):
   $C_1$ 100% crossed
   $C_2$ 100% crossed
   $C_3$ 50% crossed.

The light signal thus leaves the diode 210, enters the guide 218, divides into two equal fractions in $C_3$, one of these fractions continuing in the guide 218 and the other passing into the guide 217, after which it enters the guide 216 through $C_1$ and $C_2$ which direct it respectively to the left and to the right into the optical bus-line.

2. Connected unit being transmitter, emission of light by the diode 210 and modulation of light by $C_3$:
   $C_1$ 100% crossed
   $C_2$ 100% crossed
   $C_3$ crossed between 0 and 100% at the rhythm of the binary modulation effected on this occasion by the electrical circuit connected to the control electrodes of $C_3$.

The light signal thus leaves the diode 210, enters the guide 218 and then continues in this guide 218 or in the guide 217 depending on whether a 1 or 0 bit is applied between the pins 3 and 4. It then enters the guide 216 through $C_1$ or $C_2$, depending on which of the guides 217 and 218 is excited, and thus leaves to the right or to the left. In short, the bus line will carry a binary signal directed towards the units situated on the left and the complemented binary signal directed toward the units situated on the right. This can be useful for identifying the origin of the transmitting unit.

3. Connected unit being receiver, unidentified emission:
   $C_1$ x% crossed
   $C_2$ y% crossed
   $C_3$ 50% crossed.

The light signal received from the right or left on the bus-line is partly extracted by $C_1$ or $C_2$ and delivered to one of the guides 217 or 218. The values of x and y are selected to enable the other units situated furthest on the bus-line to be fed in such a way that each receives a signal of substantially the same strength. Half the signal coming from the guide 218 enters the guide 217, which is necessary for keeping on this same guide 217 half the light coming from $C_1$ when the transmitter is situated on the left. In this case, the guide 217 feeds the diode 211 through the fibre 212.

4. Connected unit being receiver, emission identified (for example by a code assigned to the transmitter) as coming from the left:
   $C_1$ x% crossed
   $C_2$ parallel
   $C_3$ parallel.

The light signal received from the left is partly extracted by $C_1$ and delivered to the guide 217. It crosses $C_3$ without loss and the guide 217 feeds the diode 211 at full power.

5. Connected unit being receiver, emission identified as coming from the right:
   $C_1$ parallel
   $C_2$ y% crossed
   $C_3$ 100% crossed.

The light signal received from the right is partly extracted by $C_2$ and delivered to the guide 218. $C_3$ completely transfers it to the guide 217 which feeds the diode 211 at full power.

A bus-line of the type in question functions of necessity alternately. The watching state of all the connecting devices is the state 3. When a unit is intended to transmit, it controls the passage of its own device into the state 1 or 2 depending on the arrangement adopted. The unit to which the message is addressed first detects the address which corresponds to it and if necessary controls the passage of its connecting device into one of the states 4 and 5 by detecting the position of the transmitting unit by a simple logic circuit. It is not always necessary to resort to switching such as this because, for short distances and a small number of connected units, the luminous energy received in the state 3 is perfectly adequate.

In another embodiment of a device of this type, the diodes 210 and 211 are formed by direct integration on the substrate 202. In that case, the emitting diode 210 may with advantage be a laser diode.

What we claimed is:

1. An optical connecting device for a bus line which propagates light signals in two directions, which comprises:
   a substrate;
   a first optical waveguide integrated onto said substrate for being inserted along the path of said bus line for propagating light signals in two directions;
   a second optical waveguide integrated onto said substrate;
   a third optical waveguide integrated onto said substrate;
   means for emitting in said second optical waveguide first optical signals;
   means for receiving from said third optical waveguide second optical signals;
   first means integrated onto said substrate for coupling said first and second waveguides;
   second means integrated onto said substrate for coupling said first and third waveguides;
   third means integrated onto said substrate for coupling said second and third waveguides; and
   means for controlling said first, second and third coupling means so as to control and vary the percentage of crossing.

2. A device as claimed in claim 1, wherein:
   said first coupling means comprise a first rectilinear part of said first waveguide, a first rectilinear part of said second waveguide being adjacent to said first part of the first waveguide, a first electrode covering said first part of the first waveguide, and a second and a third electrode covering said first part of the second waveguide;

said second coupling means comprise a second rectilinear part of said first waveguide, a first rectilinear part of said third waveguide being adjacent to said second part of the first waveguide, a fourth electrode covering said second part of the first waveguide, and a fifth and sixth electrode covering said first part of the third waveguide; and said third coupling means comprise a second rectilinear part of said second waveguide, a second rectilinear part of said third waveguide being adjacent to said second part of the second waveguide, a seventh electrode covering said second part of the second waveguide, and an eighth and a ninth electrode covering said second part of the third waveguide.

3. A device as claimed in claim 2, wherein said controlling means comprise a plurality of connections for applying to said first to ninth electrodes control voltages.

4. A device as claimed in claim 3, wherein said emitting means comprise a light-emitting diode and a first optical fiber for coupling said light-emitting diode and said second waveguide.

5. A device as claimed in claim 4, wherein said receiving means comprise a photo-diode and a second optical fiber for coupling said photo-diode and said third waveguide.

6. A device as claimed in claim 3, wherein said emitting means comprise a laser diode integrated onto said substrate, and said receiving means comprise a photodiode integrated onto said substrate.

* * * * *